(12) United States Patent
Reinhardt et al.

(10) Patent No.: US 6,228,204 B1
(45) Date of Patent: May 8, 2001

(54) METHOD AND APPARATUS FOR WELDING TOGETHER FLUOROPOLYMER PIPE LINERS

(75) Inventors: Walther C. Reinhardt, Kawkawlin; Ray A. Lewis, Midland; Jeff A. Ewald, Bay City, all of MI (US)

(73) Assignee: Crane Co., Stamford, CT (US)

( * ) Notice: Subject to any disclaimer, the term of this patent is extended or adjusted under 35 U.S.C. 154(b) by 0 days.

(21) Appl. No.: 09/158,589

(22) Filed: Sep. 22, 1998

Related U.S. Application Data

(60) Provisional application No. 60/073,813, filed on Feb. 5, 1998.

(51) Int. Cl.$^7$ .............................. B32B 31/00; B29C 65/52

(52) U.S. Cl. ........................... 156/304.2; 156/304.6; 156/503; 156/581; 156/583.1; 219/104; 219/464

(58) Field of Search .......................... 156/294, 304.6, 156/304.2, 502, 503, 580, 581, 583.1; 219/464, 101, 104

(56) References Cited

U.S. PATENT DOCUMENTS

| | | | | |
|---|---|---|---|---|
| 1,601,029 | * | 9/1926 | Ligonnet | 156/304.6 X |
| 2,438,685 | * | 3/1948 | Stevens | 156/304.6 |
| 2,505,647 | * | 4/1950 | Norris | 156/304.6 X |
| 3,013,925 | * | 12/1961 | Larsen | 156/304.6 X |
| 3,207,644 | * | 9/1965 | Hobson, Jr. et al. | 156/304.6 X |
| 3,929,541 | * | 12/1975 | Spears et al. | 156/304.6 X |
| 4,054,473 | * | 10/1977 | Ohnstad | 156/304.6 |
| 4,283,448 | * | 8/1981 | Bowman | 156/304.6 X |
| 4,484,975 | * | 11/1984 | McElroy | 156/304.6 X |
| 5,124,533 | * | 6/1992 | Dommer et al. | 156/304.6 X |

* cited by examiner

Primary Examiner—Francis J. Lorin
(74) Attorney, Agent, or Firm—Fitzpatrick, Cella, Harper & Scinto

(57) ABSTRACT

An apparatus for welding fluoropolymeric pipe liners together comprising: a plate having first and second opposing surfaces, the first and second opposing surfaces facing away from each other; a temperature-resistant coating overlaying at least one of the opposing surfaces; and means for heating the first and second opposing surfaces. A method for joining fluoropolymeric liners using the apparatus of the present invention is also disclosed.

7 Claims, 2 Drawing Sheets

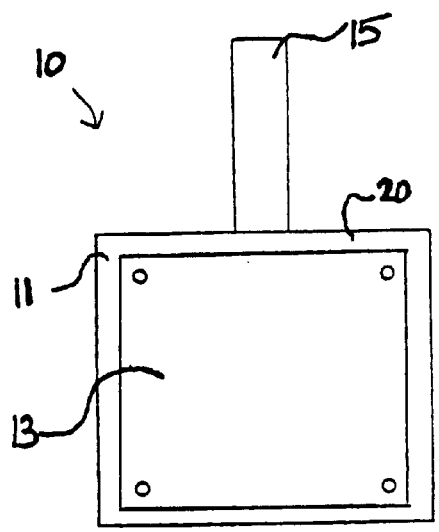
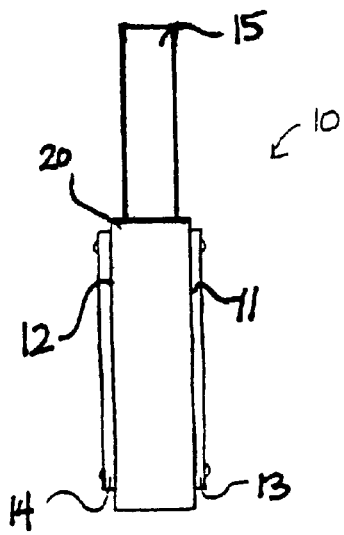
FIG. 1A
FIG. 1B
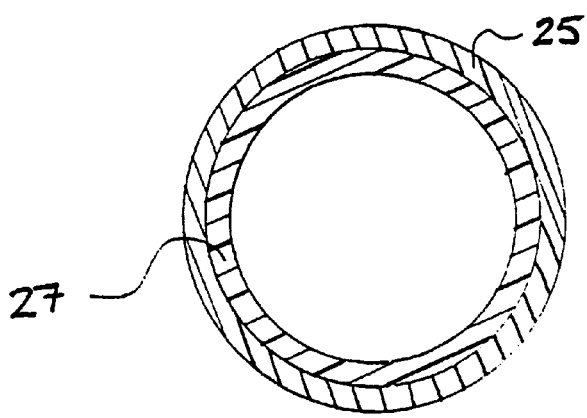
FIG. 2

METHOD AND APPARATUS FOR WELDING TOGETHER FLUOROPOLYMER PIPE LINERS

FIELD OF THE INVENTION

This application claims the benefit of U.S. Provisional Application Ser. No. 60/073,813 filed February 5, 1998. The present invention relates to components for lined piping systems and, more particularly, to metal pipe lined with fluoropolymer material.

BACKGROUND OF THE INVENTION

Metal pipe lined with non-metallic material, usually a thermoplastic substance, has been known for considerable time and is in widespread used for handling diverse materials spanning the gamut from corrosive acid to food. Many types of thermoplastics have been used for the liners. For example, polyvinylidene fluoride (PVDF), polypropylene, perfluoroalkoxy (PFA), fluorinated ethylene propylene (FEP), and polytetrafluoroethylene (PTFE) polymers are typical pipe lining materials.

Joining sections of lined pipe can be done by a variety of methods, including using flanged pipe sections and welding the pipe sections together. It is preferred to weld the pipe liners together in order to form a secure pipe joint which is less likely to leak than a flanged pipe joint.

However, when fluorinated polymeric resins are utilized as lining materials, such as PFA, FEP, and PTFE, conventional welding techniques have proven ineffective, due to, for example, the difficulty in welding melt-processable PFA and FEP to themselves using contact welding techniques, and fusing sintered or ram extruded PTFE to itself due to the lack of adhesion even when heat and pressure are employed. An attempt to overcome the adhesion problems related to joining PTFE articles is described in U.S. Pat. 3,946,136, assigned to Hoechst Aktiengesellschaft. Yet, the '136 patent describes heating the resin from the outside in rather than heating the PTFE surfaces themselves and describes using an oven. Thus, the invention described therein cannot be used in the field. Another attempt to overcome adhesion problems related to joining PTFE articles is described in U.S. Pat. No. 4,073,856, assigned to Resistoflex; however, the '856 patent describes the use of a complicated mold which does not have the capability of being used in the field.

Hot plate welding techniques have been successfully used in the field. However, hot plate welding techniques have been unsuccessful for use in welding fluorinated melt-processable materials, because the fluoropolymeric materials have adhered to the hot plate welding equipment.

Non-contact welding techniques have also been used. Such techniques utilize infrared welding energy sources which heat the exterior and also penetrate the surface and heat the interior of the polymeric article. This non-contact approach overcomes the undesirable adhesion problem of the contact heater; however, this non-contact method allows the polymeric liners to relieve residual stress from the molding process and/or extrusion process, and any additional stresses incurred during the manufacturing process. This stress relieving, associated with the penetrating heat of the infrared source, causes the ends of the liners to geometrically distort, resulting in a less than desirable weld where the liners are joined together. This non-contact method is also difficult to use in the field.

It would be an advance in the art of plastic lined pipe products to provide a simple apparatus and method for welding fluorinated polymeric pipe liners together which is capable of being used in the field.

SUMMARY OF THE INVENTION

In one aspect, the present invention as an apparatus for welding fluoropolymeric pipe liners together comprising: a plate having first and second opposing surfaces, the first and second opposing surfaces facing away from each other; a temperature-resistant coating overlaying at least one of the opposing surfaces; and means for heating the first and second opposing surfaces.

In a second aspect, the present invention is a method for joining first and second fluoropolymeric liners to each other, comprising: contacting the first opposing surface of the aforementioned apparatus to an end of a first fluoropolymeric liner under pressure; contacting the second opposing surface of the aforementioned apparatus to an end of a second fluoropolymeric liner under pressure; removing the apparatus; and pressing the ends of the fluoropolymeric liners together liner under pressure to form a weld.

The present invention provides a simple solution to the problem of welding fluoropolymeric lining materials. The present invention provides an apparatus and a contact method of welding fluoropolymeric liners together which is capable of being used outdoors in the field or indoors where the piping system is to be assembled. The present invention can be used to weld together (1) melt-processable fluorinated polymeric PFA and FEP liners, (2) sintered or ram extruded PTFE liners, and (3) sintered or ram extruded PTFE liners utilizing a melt-processable fluorinated polymeric adhesive layer.

BRIEF DESCRIPTION OF THE DRAWINGS

FIG. 1A is a front view of a hot plate heater of the present invention.

FIG. 1B is a side view of the hot plate heater in FIG. 1A.

FIG. 2 is a cross sectional view of a section of thermoplastic lined pipe with which the present invention is designed to be used.

DETAILED DESCRIPTION OF THE INVENTION

Figure 3A:
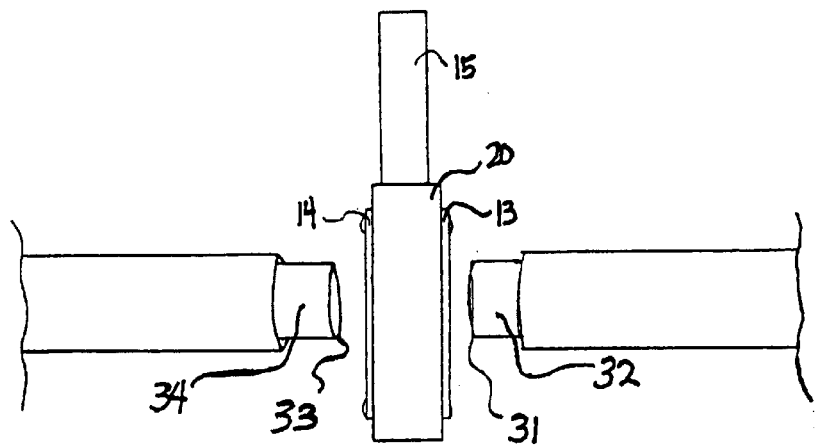
FIGS. 3A–3C are side views illustrating the process of the present invention.

FIGS. 1A–1B illustrate front and side views, respectively, of a hot plate heater 10 of the present invention. The heater 10 comprises a main heating plate 20 having a first opposing surface 11, a second opposing surface 12 which faces away from the first opposing surface 11; a temperature-resistant coating overlaying at least one of the opposing surfaces 11 and/or 12; and means for heating the opposing surfaces.

In a preferred embodiment, the apparatus includes panels 13 and 14 which are attached to the opposing surfaces 11 and 12, respectively. Panel 13 has an external surface which faces away from the apparatus, and panel 14 also has an external surface which faces away from the apparatus. In this preferred embodiment, the temperature-resistant coating overlays at least the external surfaces of panels 13 and 14, such that the coated external surfaces can act as contact surfaces.

The shape of panels 13 14 and plate 20 is not critical. For example, as seen from a front view, the plate 20 can be rectangular, as shown in FIG. 1, or the plate can be circular. The size of heater 10 is not critical, as long as the panels 13 14 and plate 20 are large enough so that the external surfaces of panels 13 and 14 can cover the cross section of a pipe that is from 1 inch (2.54 cm) to 6 inches (15.24 cm) in diameter.

The panels 13 14 and plate 20 can be made of any material which is strong enough to withstand the pressures and temperatures described herein. Suitable materials of construction for the panels 13 14 and plate 20 include carbon steels and steel alloys including stainless steel, brass, copper, and aluminum. Aluminum is the preferred material of construction due to desirable heat transfer and acceptable coating adherence characteristics.

The external, or contact surfaces of panels 13 and 14 can be modified using common machining practices to optimize the panel surface geometry. Panel surface geometry modification can be utilized to control the penetration of heat into the fluoropolymeric liner, restrict movement of the liner when heated as residual process and manufacturing stresses are relieved, and assist in locating the melt-processable fluoropolymer adhesive layer which can be used to join together sintered or ram extruded PTFE liners.

In the preferred embodiment, the apparatus of the present invention includes a temperature-resistant coating overlaying at least one of the opposing external surfaces of panels 13 and/or 14. The coating enables the apparatus of the present invention to heat melt-processable fluoropolymeric lining materials without having the lining materials adhere to the opposing surfaces. The term "temperature-resistant" is defined herein to mean that the coating remains intact when exposed to temperatures of 600 degrees Fahrenheit (315° C.) and even as high as 900 degrees Fahrenheit (482° C.).

The material used for the temperature resistant coating is not critical, as long as the coating can heat the melt-processable fluoropolymeric and/or sintered or ram extruded PTFE lining material without the problem of having the lining material adhere to the coating. An example of a resistant coating includes a porous nickel base which is impregnated with one or more fluorocarbons, one or more dry lubricants, or a combination thereof. An example of a dry lubricant includes titanium disulfide. Such coatings are available commercially from General Magnaplate Corp. (Linden, N.J.) under the HTR or HMF trademarks.

The coating can be applied to the opposing surfaces by any suitable means. For example, the coating can be applied using spray coating techniques, electrostatic coating techniques, plasma deposition techniques, or any other suitable method.

The thickness of the coating is thick enough to prevent the fluoropolymeric liner from adhering to the opposing surfaces or the contact surfaces. Preferably, the coating is at least 0.001 inches (0.025 mm) thick, more preferably at least about 0.0025 inches (0.064 mm) thick and even more preferably at least about 0.004 inches (0.10 mm) thick. Preferably, the coating is no more than about 0.015 inches (0.38 mm) thick, more preferably no more than about 0.0125 inches (0.32 mm) thick and even more preferably no more than about 0.010 inches (0.25 mm) thick.

The apparatus of the present invention also includes means for heating the opposing surfaces 11 12 and the contact surfaces of panels 13 and 14. Such means for heating the coated surfaces can include, for example, one or more electrical cartridge heaters inside the plate 20, or one or more electrical coins inside the plate 20. The heat is then conducted through the metal plate and/or panels 13 and 14 to the contact surfaces.

Optionally, the apparatus of the present invention includes a handle 15 which is made out of a non-heat conductive material such as wood. The handle 15 enables a user to hold the heater in positions without being burned.

The apparatus illustrated in FIGS. 1A and 1B is advantageously used in conjunction with plastic lined piping products to join the plastic liners together. Referring now to FIG. 2, therein is shown a cross section of a piece of plastic lined pipe which comprises a metal pipe 25 lined with a thermoplastic liner 27.

The particular type of pipe 25 is not critical and can include, for example, carbon steel, stainless steel or any other suitable piping material. The size of the pipe 25 is not critical; however, preferably the pipe 25 has a diameter of from about 1 (2.54 cm) to about 6 inches (15.24 cm).

For use in conjunction with the present invention, the liner 27 is a fluoropolymeric material. Preferably, the liner 27 is a perfluoroalkoxy (PFA), a fluorinated ethylene propylene (FEP), a polytetrafluoroethylene (PTFE) polymer, or a modified PTFE polymer, with or without a filler. Modified PTFE polymers include those PTFE resins which have been modified specifically for improved weld strength or lower permeability. Typically, modified PTFE resins include an additive which is added during polymerization, such as perfluoropropylvinylether (PPVE), in an amount around 0.10% by weight. Examples of modified PTFE polymers include TFM1105 and TFM1600, both available from Dyneon and sold under the HOSTAFLON trademark.

The thickness of the liner depends upon the size of the pipe. For pipe having a diameter of from 1 inch (2.54 cm) to 3 inches (7.62 cm), the thickness of the liner is preferably from about 0.1 inches (2.54 mm) to about 0.15 inches (3.81 mm). For pipe having a diameter of from 4 inches (10.16 cm) to 6 inches (15.24 cm), the thickness of the liner is preferably from about 0.100 inches (2.54 mm) to about 0.175 inches (4.45 mm). More details about PTFE liners can be found in U.S. Pat. Nos. 4,203,938, 4,430,282 and 4,350,653.

Preferably, a frame and clamping assembly is also used with the method and apparatus of the present invention, in order to facilitate joining the pipe and to ease the use of the present invention in the field. Such frame and clamping assemblies are described in U.S. Pat. Nos. 4,484,975, 4,533, 424, and 4,352,708, all of which are incorporated herein by reference.

Figure 3B:
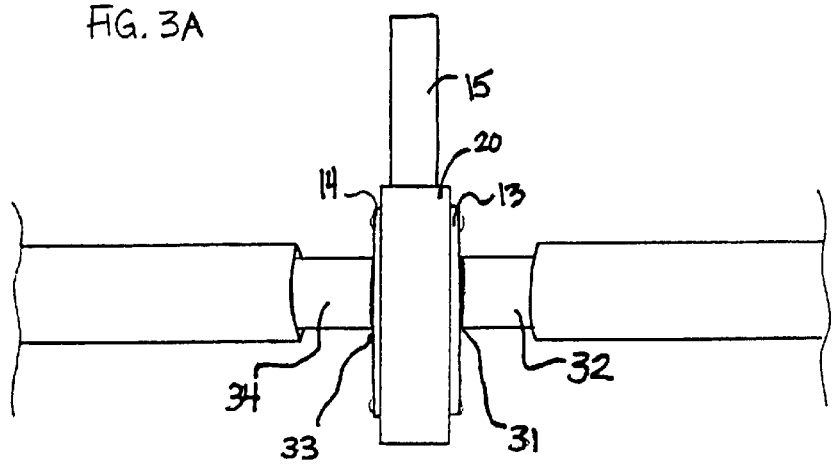
Figure 3C:
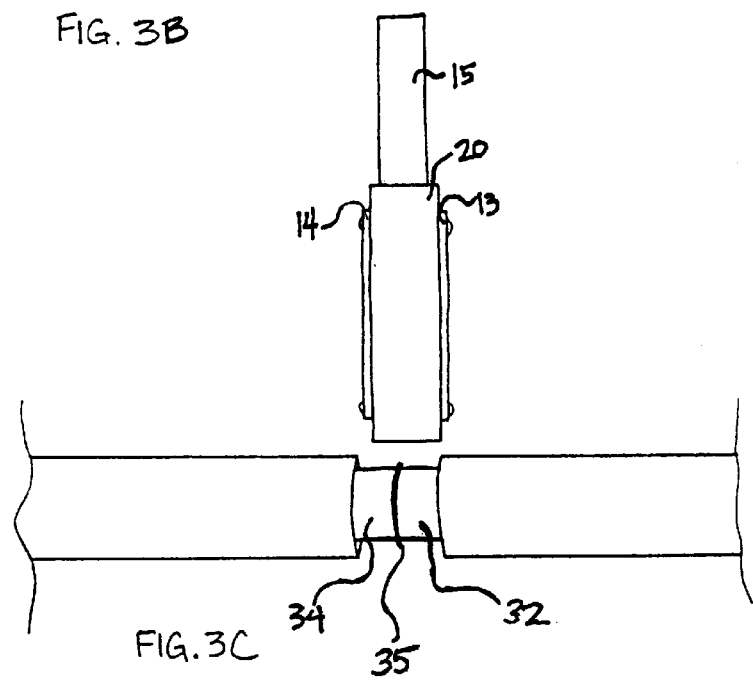

The method of joining the fluoropolymeric liners is illustrated in FIGS. 3A through 3C and includes the steps of contacting an end 31 of a first fluoropolymeric liner 32 with the first opposing surface pressure; contacting an end 33 of a second fluoropolymeric liner 34 with the second opposing surface under pressure; removing the opposing surfaces from the first and second fluoropolymeric liners 32 34; and pressing the ends 31 and 33 of the first and second fluoropolymeric liners 32 and 34 into contact with each other. The ends 31 and 33 fuse together to form a weld 35.

Preferably, the opposing surfaces which contact the fluoropolymeric liners are the external, or contact surfaces of panels 13 and 14.

Preferably, the opposing surfaces of panels 13 and 14 in the embodiment shown, are heated to above 590 degrees Fahrenheit (310° C.) prior to contacting them with the ends 31 and 33 of the fluoropolymer liners 32 and 34. Preferably, the opposing surfaces are heated to a temperature of at least about 600 degrees F (315° C.), more preferably at least about 625 degrees F (329° C.), even more preferably at least about 650 degrees F (343° C.), and yet even more preferably at least about 700 degrees F (371° C.). Preferably, the opposing surfaces are heated to a temperature of less than 950 degrees F (510° C.), more preferably less than about 925 degrees F (496° C.), even more preferably less than about 900 degrees F (482° C.), and yet even more preferably less than about 850 degrees F (454° C.).

The method of the present invention is most effective when the opposing surfaces contact the ends of the fluoropolymeric liners under pressure for a period of time. Preferably, this contacting step is performed at a pressure, referred to herein as the "heating" pressure, of at least about 12 pounds per square inch (Psi)(82.7 kPa), more preferably at least about 25 pounds per square inch (172.4 kPa), and even more preferably at least about 35 pounds per square inch (241.3 kPa). Preferably, the heating pressure is less than about 150 pounds per square inch (1034 kPa), more preferably less than about 100 pounds per square inch (689 kPa), and even more preferably less than about 75 pounds per square inch (517 kPa). Advantageously, the heating pressure is higher for larger pipe diameters and lower for smaller pipe diameters. Optimally, the heating pressure starts out large and decreases as the liner material heats up and begins to flow.

Preferably, the opposing surfaces are held in contact with the ends of the fluoropolymeric liners for a time period of at least about 1 minute, more preferably at least about 2 minutes. The upper limit of the time period is not critical; however, preferably, the opposing surfaces are held in contact with the ends of the fluoropolymeric liners for a time period of no more than one hour, more preferably no more than about 30 minutes, even more preferably no more than about 15 minutes, yet even more preferably no more than about 10 minutes, and yet even more preferably no more than about 5 minutes.

After the ends of the fluoropolymeric liners have been heated, the hot plate heating apparatus 10 is removed, and the ends of the liners are pressed together under pressure for a period of time in order to form the weld 35. Preferably, the liners are pressed together under a pressure, referred to herein as the "welding" pressure, of at least about 30 Psi (207 kPa), more preferably at least about 40 Psi (276 kPa), and even more preferably at least about 50 Psi (345 kPa). Preferably, the welding pressure is no more than about 125 Psi (862 kPa), more preferably no more than about 100 Psi (689 kPa), and even more preferably no more than about 75 Psi (517 kPa). Optimally, the welding pressure starts out small while the liner ends are still able to flow, and increases.

Preferably, welding pressure is held for at least about 25 seconds, more preferably at least about 30 seconds, and even more preferably at least about 35 seconds. The combination of the pressure and the time should be sufficient to form the weld 35. Advantageously, the weld is allowed to cool for at least about 2 minutes, more preferably at least about 3.5 minutes, and even more preferably at least about 5 minutes.

When the first and second fluoropolymeric liners are PTFE or modified PTFE, the method advantageously further comprises the step of applying a layer of PFA or FEP to the first fluoropolymeric liner prior to contacting the first fluoropolymeric liner with the first opposing surface. Even more advantageous is to also apply a layer of PFA or FEP to the second fluoropolymeric liner prior to contacting the second fluoropolymeric liner with the second opposing surface. In this manner, the PTFE liners do not fuse directly to each other because the PFA or FEP acts as an interlayer. In other words, the PTFE liner fuses to the PFA or FEP layer, which then fuses to the other PTFE liner or to the other PFA or FEP layer, thereby eliminating some of the problems associated with bonding PTFE to itself.

In the embodiment using PFA or FEP as an interlayer, the PFA or FEP layer is preferably at least about 0.002 inches (0.05 mm) and more preferably at least about 0.005 (0.127 mm) inches. The PFA layer is preferably less than about 0.500 inches (12.7 mm) and more preferably less than about 0.250 inches (6.35 mm).

In the embodiment using PFA or FEP as an interlayer, the PFA/FEP layer may be applied to the end of the PTFE liner using any suitable means. For example, the PFA/FEP can dispersed in a carrier fluid and sprayed on the end of the PTFE liner. Alternatively, a PFA/FEP film or a ring of PFA/FEP can be placed against the end of the PTFE liner as the opposing surface is brought into contact with the PTFE liner.

The weld 35 of the present invention preferably has integrity which is equivalent to the liner materials. The integrity of the weld 35 can be determined using any suitable method. For example, the integrity of the weld 35 can be determined by cutting out a sample of the weld, forming tensile bars according to ASTM D638, and testing the tensile strength and elongation using an INSTRON machine. Such methods are commonly used and are well known in the art.

In a preferred embodiment, a coupling, such as those sold by The Dow Chemical Company under the CONQUEST trademark, is advantageously used to join the sections of pipe. In such an embodiment, sometimes the weld 35 might experience creeping at elevated operating pressures. In other words, the liner material might creep into any void space between the weld 35 and the coupling surrounding the weld 35. Creeping is undesirable, as it will reduce optimal burst strength and fatigue life of the weld. In order to avoid such a situation, a preferred embodiment further comprises surrounding the weld 35 with a support. For example, a tape can be wound around the weld 35, or a solid ring or sleeve can be placed around the weld. The tape, ring or sleeve thus serve as a support.

Preferably, the support is PFA, PTFE or modified PTFE, although any other suitable material may be used. The thickness of the support depends upon the thickness of the void space between the weld and the coupling surrounding the weld. The thickness of the support is not critical, as long as it is sufficient to act as a spacer to fill in the void space, thereby increasing the burst strength of the weld 35.

EXAMPLES

The following examples are provided as further illustration of the invention and are not to be construed as limiting.

For each of the following examples, 2 foot (61 cm) spools of 2-inch (5.08 cm) swaged pipe are used. Swaged pipe is formed by inserting a preformed polymeric liner into an oversized pipe segment and physically compressing both the pipe and the liner under tremendous pressure such that the lner and the pipe segment are reduced in size to the finished pipe segments to the finished diameters, in this case, 2 inches (5.08 cm).

The 2-foot pipe spools are welded together according to the method of the present invention to form a 4-foot pipe assembly. The hot plate heater used for these examples is purchased from McElroy Manufacturing, Inc. (Tulsa, Okla.). Removable panels having a height of 5 inches (12.7 cm), a width of 6 inches (15.2 cm), and a thickness of ⅜ inches (0.952 cm), are attached to the opposing surfaces of the hot plate heater. The panels are coated with HTR nickel-based coating, available from General Magnaplate Corp. (Linden, N.J.).

To form the weld, the hot plate heater is heated to 785 degrees Fahrenheit (418° C.). The opposing faces of the plate are held in contact with the liner ends for 4 minutes at a heating pressure of 35 PSI (241 kPa). A 5 mil (0.13 mm) PFA film (DuPont 350 resin) is placed between each of the opposing faces and the liner ends before contacting. After the 4 minute heating time, the plate is removed, and the liner ends are pressed together at a welding pressure of 52 Psi (359 kPa) for 40 seconds to form the weld. The weld is allowed to cool for 5 minutes before testing.

For some examples, a sample of the weld is cut out, and tensile bars are formed according to ASTM D638. Testing of the tensile strength and elongation are performed using an INSTRON machine according to methods commonly known in the art.

Burst strength is tested by first bolting a blind steel spacer to the outer ends of the 4-foot pipe assembly, using a ⅛ inch (3.18 mm) PTFE gasket for sealing purposes. The pipe assembly is filled with water and connected to a hand pump with 10,000 Psi (68.9 mPa) capability. The pressure is allowed to build until failure.

Table I lists the test results for each example.

TABLE I

| Example | Liner Material | Support Material | Tensile Strength (Psi) | % Elongation | Burst Strength (Psi) |
|---|---|---|---|---|---|
| 1 | Dupont 9B PTFE resin | None used | 2503 (17.2 mPa) | 165 | 1700 (11.7 mPa) |
| 2 | HOSTAFLON TFM1105 modified PTFE resin | None used | 3250 (22.4 mPa) | 310 | |
| 3 | Dupont 9B PTFE resin | Glass-reinforced PTFE tape | | | 4500[1] (31.0 mPa) |
| 4 | Dupont 9B PTFE resin | Dupont 9B PTFE resin ring | | | 4500[1] (31.0 mPa) |

[1]Gasket failed before the weld failed.

What is claimed is:

1. A method for joining a first end of a first fluoropolymeric liner to a first end of a second fluoropolymeric liner, said fluoropolymeric liners comprising PTFE or modified PTFE material, comprising the steps of:

applying a layer of PFA or FEP to at least one of said first ends;

heating said first ends by contacting said first ends to a surface heat source;

pressing said heated first ends together to form a weld.

2. The method of claim 1 wherein said surface heat source has a temperature of from about 590 degrees Fahrenheit to about 950 degrees Fahrenheit.

3. The method of claim 1 wherein said first ends are contacted to said surface heat source at a pressure of from about 15 pounds per square inch to about 150 pounds per square inch.

4. The method of claim 1 wherein said first ends are contacted to said surface heat source for a time period of from about 1 minute to about one hour.

5. The method of claim 1 further comprising surrounding the weld with a support.

6. The method of claim 5 wherein the support comprises PFA, PTFE or modified PTFE.

7. The method of claim 6 wherein the support is in the form of a tape or a solid ring.

* * * * *